United States Patent
Kuo

[11] Patent Number: 6,076,562
[45] Date of Patent: Jun. 20, 2000

[54] PRE-STRESSED CONCRETE PIPE

[76] Inventor: Ming C. Kuo, 19350 Christina Ct., Cerritos, Calif. 90703

[21] Appl. No.: 09/318,114

[22] Filed: May 25, 1999

[51] Int. Cl.$^7$ .................................................... F16L 9/08
[52] U.S. Cl. .......................... 138/175; 138/98; 138/141; 138/178; 138/DIG. 5
[58] Field of Search .............................. 138/175, 98, 141, 138/178, DIG. 5

[56] References Cited

U.S. PATENT DOCUMENTS

| | | | |
|---|---|---|---|
| 3,982,565 | 9/1976 | Iida | 138/176 |
| 4,153,656 | 5/1979 | Bunyan | 264/269 |
| 4,606,378 | 8/1986 | Meyer | 138/145 |
| 4,771,530 | 9/1988 | Creedon . | |
| 4,840,200 | 6/1989 | Creedon . | |
| 5,065,795 | 11/1991 | Creedon . | |
| 5,645,375 | 7/1997 | Stephens | 138/98 |
| 5,928,447 | 7/1999 | GianFrancisco | 138/98 |

*Primary Examiner*—James Hook
*Attorney, Agent, or Firm*—Gordon K. Anderson

[57] ABSTRACT

An outer pipe casing (20) and a concrete tube (26) cast inside, form a pre-stressed concrete pipe in its elementary form. Prior to casting, a layer of non-cohesive material (28) is sprayed on the inside of the pipe casing and an annular ring (32) is welded inside adjacent to each end. A resilient seal ring (46) is captivated into the inwardly facing legs (38) of the second channel (36) of each annular ring and a temporary seal (52) separates each annular ring from the material (28). After the concrete of the tube cures, a pressurized solidifying compound (54) is inserted under pressure to a pathway (42) formed into each annular ring and it is also extruded into a region (30) coated by the non-cohesive material. Pressurization of the compound is sufficient to cause the pipe casing to bulge outwardly and compression of the concrete in the tube is achieved. When the compound hardens, the compressive force remains and pre-loads the pipe. As the outer casing bulges externally when pressurized by the compound, the seal ring (46) is compressed tightly against the concrete of the tube assuring and maintaining an absolute closure between the tube and the annular ring.

19 Claims, 4 Drawing Sheets

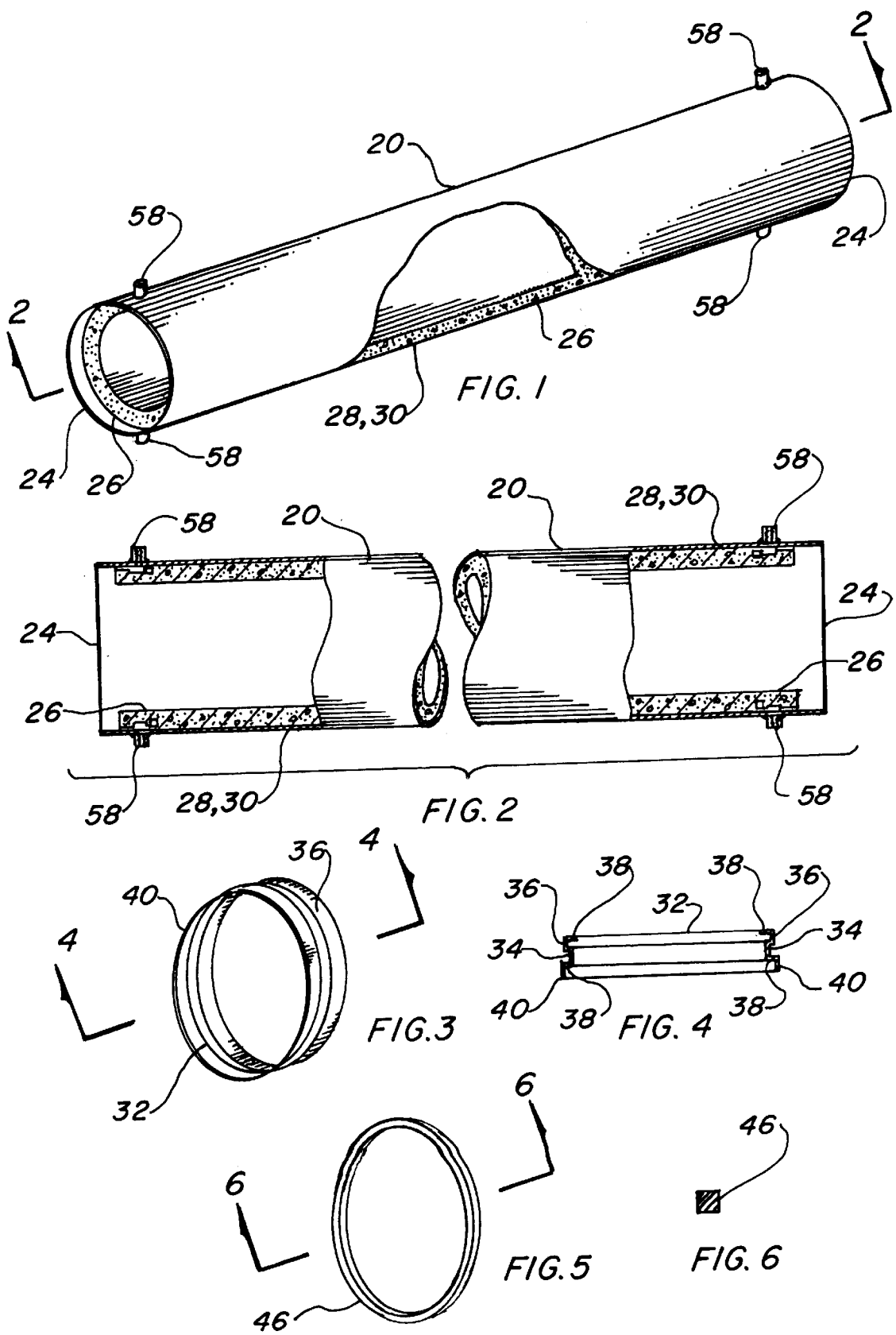

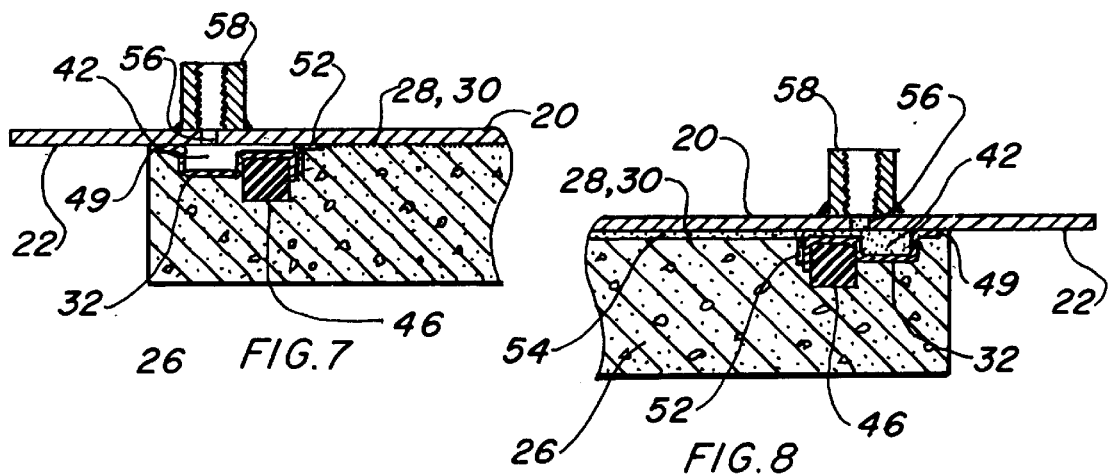
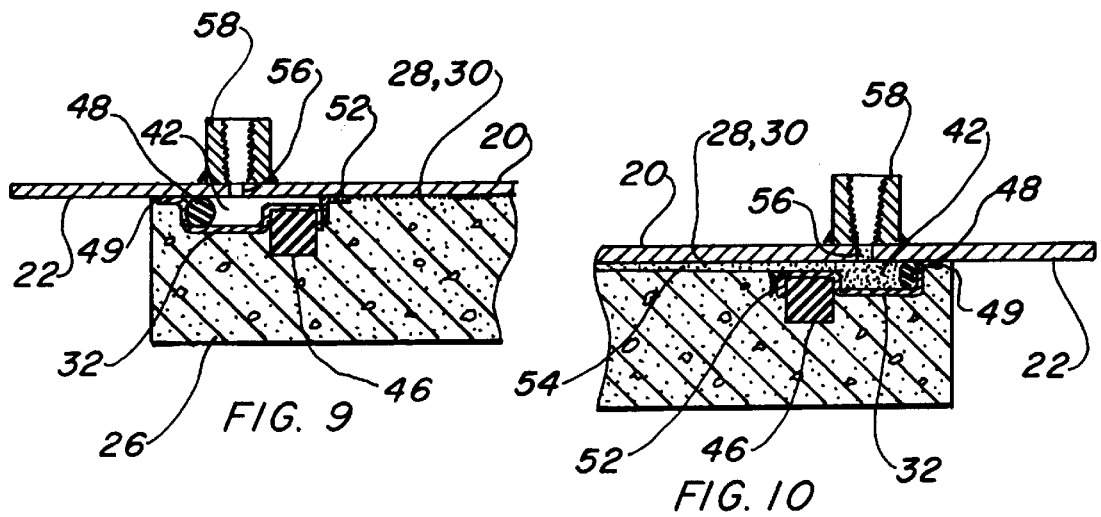
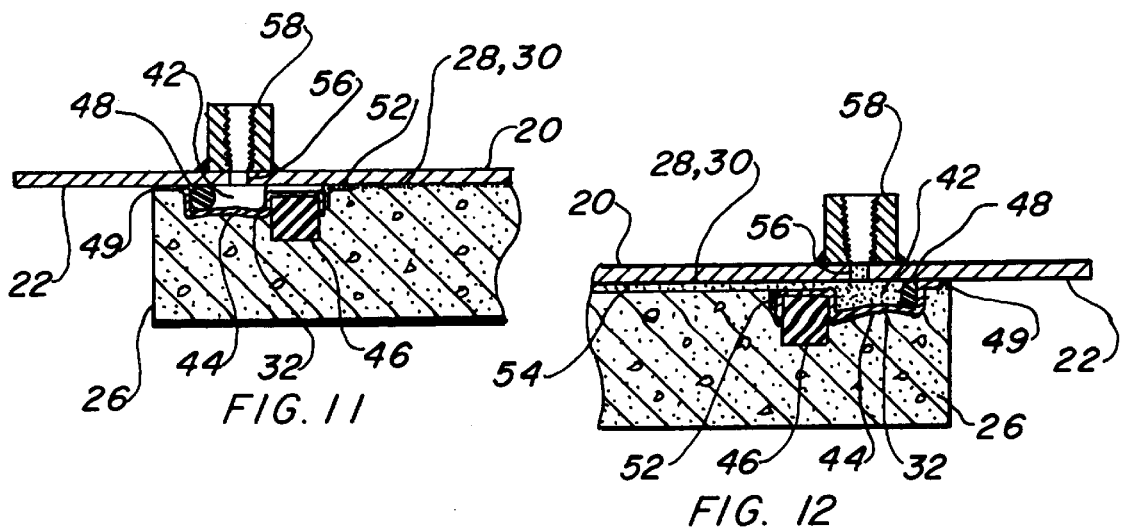

PRE-STRESSED CONCRETE PIPE

TECHNICAL FIELD

The present invention relates to concrete pipe in general, and more particularly to a pipe that includes a metallic outer casing with pressurized solidifying compound between the casing and the concrete pipe.

BACKGROUND ART

Previously, pre-stressed concrete pipe and members used for building columns, liquid storage tanks, bridges, fluid flow, etc., have utilized tensioning members made of steel, usually bars or wires commonly called tendons that have been tensioned by stretching with hydraulic jacks, or the like. The goal is to eliminate tension forces on load bearing members, as concrete has considerable compression potential, but little tensile strength. It has been found that many approaches have been attempted in order to solve this problem, including both pre-tensioning and post-tensioning, which are well known in the art, also some have encased concrete pipe in an enclosure and filled the gap with grout or some other solidifying substance under pressure.

A search of the prior art did not disclose any patents that read directly on the claims of the instant invention, however, the following U.S. patents are considered related:

| Patent No. | Inventor | Issue Date |
| --- | --- | --- |
| 5,065,795 | Creedon | Nov. 19, 1991 |
| 4,840,200 | Creedon | Jun. 20, 1989 |
| 4,771,530 | Creedon | Sep. 20, 1988 |

U.S. Pat. No. 5,065,795, issued to Creedon, discloses a pre-stressed concrete article that overlays the ends and utilizes gasket rings between the end walls. A hardenable medium is injected in between a jacket and the concrete article which generates sufficient pressure to outwardly bulge the jacket, drawing the end walls together, thereby compressing the gaskets.

Creedon's U.S. Pat. No. 4,840,200 teaches a pre-stressed tube and a method of manufacture. A non-adhering lamina layer receives a medium that is injected under pressure. The medium provides a force to the tube with one or both walls of the layer enlarging and when hardened, provides a permanent leak-proof pre-stress force to the tube. The tube is preferably wound with filaments around a thin walled inner shell and the non-adhering lamina is a film of Teflon or waxed paper. The utility is for lightweight tubes capable of withstanding large bursting forces, such as a rail gun barrel.

U.S. Pat. No. 4,771,530 of Creedon is for methods of pre-stressed concrete members using a pressure containing casing positioned around the outside surface leaving a cavity therebetween. A pressurized medium is injected into the cavity at a pressure sufficient to apply the required pre-stress force. The pressurized medium changes form by hardening after injection and includes grout, thermoset plastic, and epoxy resin. When the concrete member is cast, a cavity is formed by peeling the concrete member and casing away from each other as the medium is injected.

It will be noted that the teachings of pre-stressing a pipe using a hardenable medium under pressure is old and well known in the art, however, simple and reliable methods have been lacking. Further utilization of mechanical features that provide a substantial seal at the end of the tube along with convenient entry points have not been taught by the prior art disclosed.

DISCLOSURE OF THE INVENTION

Historically, because concrete structures, such as pipes, conduits, columns and storage tanks have little tensile strength, and yet, ample compression strength, significant development has been directed into pre-stressing these configurations to make their use practical. As previously mentioned, reinforcement, such as stretched reinforcing members and, in its simplest form, bars and wires embedded in the concrete itself have proven to be practical. However, when pre-stressing is required, the known methods have been cost and labor intensive. Winding wire around a structure and coating the outside has also been attempted with some success, however, again cost is a factor. It is, therefore, a primary object of the present invention to pre-stress a concrete pipe by forming a minute gap between an outer casing made of a thin metal and an inner concrete tube. The invention utilizes a liquidous substance that is injected, without voids, throughout the gap under high pressure while maintaining a positive seal on each end of the pipe. The substance is allowed to harden in place therefore maintaining its compressive forces.

An important object of the invention is a simple and easy method of construction accomplished by simply coating the inside of the casing with a non-cohesive material, preferably a petroleum based substance, such as oil. This process is extremely uncomplicated and easily accomplished with a minimum of labor, further, the coating creates a relatively even region throughout the casings inner wall in-between the concrete pipe.

Another object of the invention is the ease in which trapped air may be relieved from the spatial pathway at each end of the pipe. A vent is provided at both places by drilling a hole in the casing and welding on a boss or simply tapping the hole. A plug is twisted into the threaded opening permitting trapped air to be vented easily and then sealed with the plug.

Still another object of the invention is directed to the use of a standard sized steel outer pipe casing that is easily fabricated and available throughout the country. As the only modification necessary is to add the holes and couplings, these casings are relatively inexpensive and welding an annular ring adjacent to each end is easily accomplished with conventional automatic tools and moderately skilled personnel.

If the application requires a precision fit between pipes, the casing may be sized by expansion using conventional methods without affecting the balance of the modifications. Further, the concrete tube is cast over a conventional mandrel using construction methods that are both well known and within the skill of those knowledgeable in the art.

Yet another object of the invention is accomplished by the unique configuration and positioning of an annular ring having a resilient seal ring embedded therein welded adjacent to each end of the pipe's metallic casing. When pressure is applied within a region coated with non-cohesive material between the casing and the concrete tube, the casing expands and the seal ring is pressed into a tight relationship with the concrete tube. The actual presents of pressure around the resilient deal ring assures an effective seal.

A further object of the invention has to do with the attachment means between the ends of each pipe. As each extremity consists of a simple open ended round metallic pipe, conventional methods may be employed such as welding, couplings with O-rings, slip fit, etc., all within the capabilities of a skilled artisan.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment.

FIG. 2 is a fragmentary cross-sectional view taken along lines 2—2 of FIG. 1.

FIG. 3 is a double channel annular ring completely removed from the invention for clarity.

FIG. 4 is a cross-sectional view taken along lines 4—4 of FIG. 3.

FIG. 5 is a resilient seal ring completely removed from the invention for clarity.

FIG. 6 is a partial cross-sectional view taken along lines 6—6 of FIG. 5 illustrating only half of the seal ring.

FIG. 7 is a partial end cross section view of the invention.

FIG. 8 is a partial end cross section view of the invention with solidifying compound in place.

FIG. 9 is a partial end cross section view of the invention including an O-ring.

FIG. 10 is a partial end cross section view of the invention including an O-ring with solidifying compound in place.

FIG. 11 is a partial end cross section view of the invention including an O-ring and a upset bend in the annular ring.

FIG. 12 is a partial end cross section view of the invention including an O-ring and a upset bend in the annular ring with solidifying compound in place.

BEST MODE FOR CARRYING OUT THE INVENTION

Figure 13:
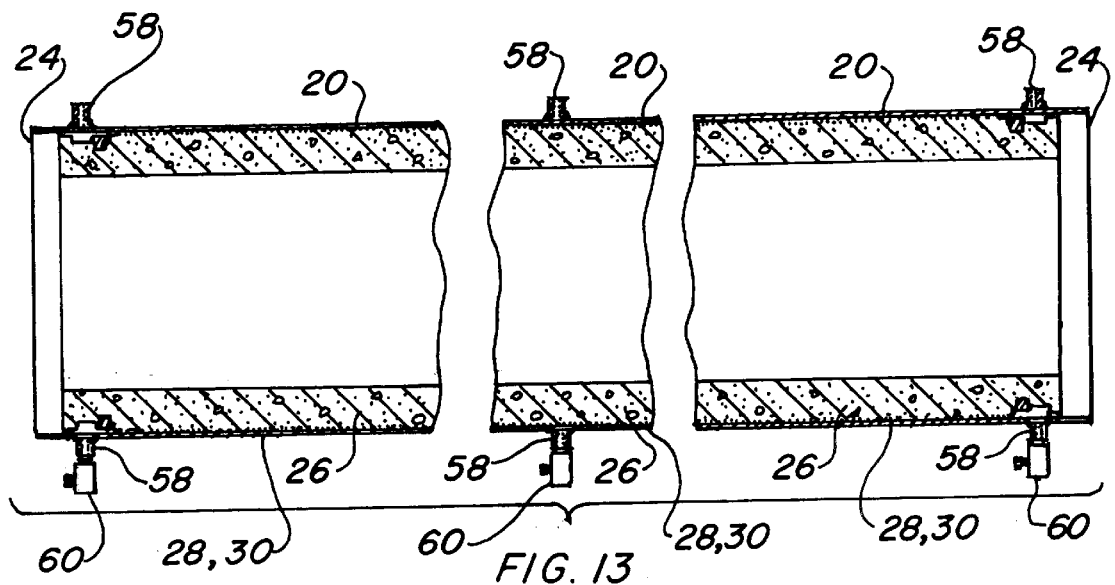
FIG. 13 is a fragmentary cross-sectional view of the invention with check valves in place within the bosses.

The best mode for carrying out the invention is presented in terms of a preferred embodiment with other secondary configurations. The preferred embodiment, as shown in FIGS. 1 through 17, is comprised of a hollow tubular outer pipe casing 20 of metal, preferably steel. The casing 20 may be seamed or seamless of a construction that is conventional and easily obtained. Obviously, the casing has an inner wall 22 and opposed ends 24, and the thickness of the material may vary relative to the diameter of the pipe and the amount of pre-stress required for the application. The thickness, however, must be sufficient to permit controlled expansion and deformation when subjected to internal pressure.

A concrete tube 26 is formed within the interior of the casing 20 by casting with liquidous concrete poured over a mandrel in an ordinary manner well known in the industry. Prior to casting, a film layer of a non-cohesive material 28 is applied by spraying, or the like, to the inner wall 22 of the pipe casing 20, thus forming a superficial fissure region 30 therebetween when the concrete tube 26 is cured. This non-cohesive material 28 may be of any type suitable for the application as long as it prevents adherence of the concrete to the metal wall of the casing 20, however, a petroleum based substance, such as oil, has been found to be ideal and is inexpensive and easy to obtain, leaving a uniform gap of a thickness dependent upon the viscosity of the oil.

Figure 14:
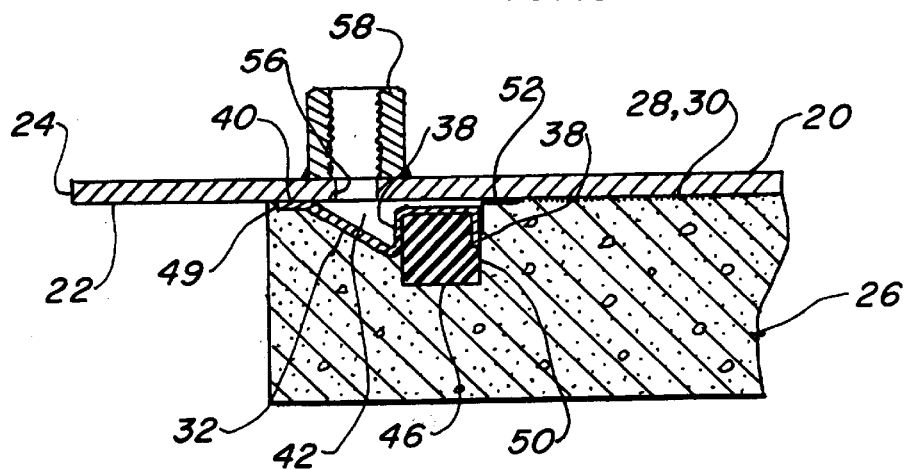
FIG. 14 is a partial end sectional view of the invention with an alternate embodiment of the seal ring.

A metallic double channel shaped annular ring 32 is positioned within each end of the pipe casing 20 prior to casting the tube 26. Each annular ring 32 is located adjacent to the casing ends 24 contiguous with its inner wall 22. The annular ring 32 is of a roll-formed construction with its ends welded together forming a continuous annulus. The ring 32 is illustrated by itself in FIGS. 3 and 4 and in cross-section in the remainder of the figures. The configuration of the ring 32 is important as it is formed with a first channel 34 and an opposed second channel 36 with the legs 38 of the first channel facing the pipe casing 20 inner wall 22. The second channel 36 has its legs 38 facing inwardly in the opposite direction. A longitudinal flange 40 integrally extends from an outermost leg 38 of the first channel 34, as depicted in FIG. 4 and is of a diameter only slightly smaller than the inside diameter of the casing 20 permitting a slip-fit therebetween. The flange 40 intimately embraces the casing 20 while the first and second channels 34 and 36 are away from the inner wall in the open and inverted direction, thereby forming a peripheral spatial pathway 42 within the void. This pathway 42 is larger within the first channel 34 and considerably smaller over the second channel 36, as it is inverted, therefore, only the spacing of the back of its web creates a secondary portion of the pathway 42, however, it will be seen that both channels contribute to the pathway. FIG. 14 illustrates an embodiment of the ring 32 wherein one flange of the first channel 34 is omitted. The thickness of the metal forming the annular ring 32 is of utmost importance, as it needs to be thin enough to bend or yield at the proper time, and yet, thick enough to have the necessary rigidity to hold the weight of the tube 26 if the tube is vertically cast.

Figure 15:
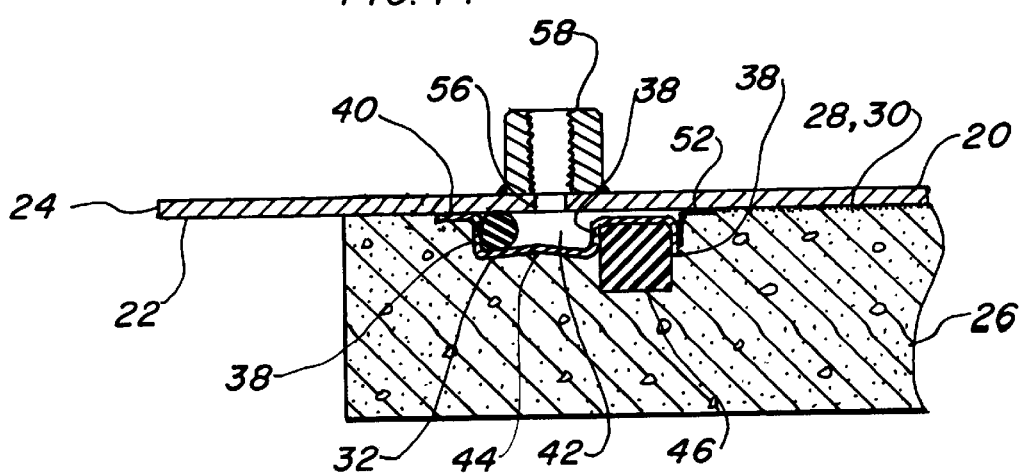
FIG. 15 is a partial end sectional view of the invention less the weld for the annular ring.
Figure 16:
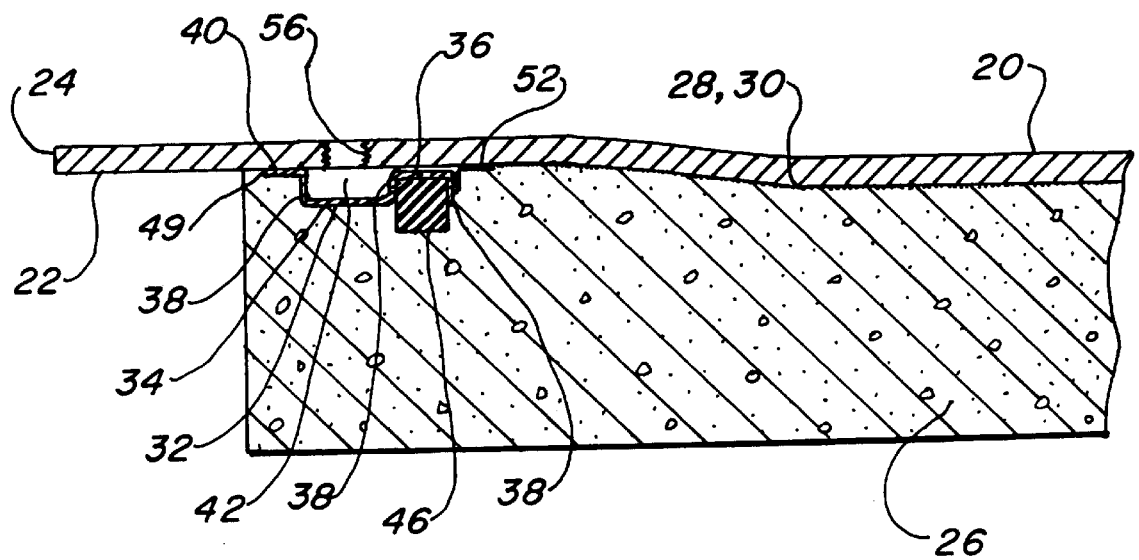
FIG. 16 is a partial end sectional view of the invention with a threaded hole and a swaged pipe casing.

In a secondary embodiment of the annular ring 32, illustrated in FIGS. 11, 12 and 15, the first channel 34 incorporates an upset bend 44 facing the inner wall 22 of the pipe casing 20. The purpose of this bend 44 is to permit the ring 32 to bow at the bend when linear contraction of the pipe casing 20 is encountered, due to the Poisson ratio effect on steel, without deforming the balance of the annular ring 32.

The annular ring second channel 36 provides a seat for a resilient seal ring 46 captivating this ring on three sides with a snug fit, as shown in FIGS. 1, 2 and 7 through 17. There are two potential leakage paths around this annular ring 32 the first may be designated the inner leakage path which runs between the rings longitudinal flange 40 and the pipe casing 20. The second leakage path may be called the outer leakage path which exists between the inside portions of the annular ring 32, the periphery of the seal ring 46 and the interface with the concrete tube 26 as the concrete may develop minute shrinkage when it hardens leaving a slight cleavage therebetween. The seal ring 46 is contiguous with the concrete tube 26 and forms an impervious restricting band assuring a hermetic closure within the outer leakage path when the pipe is pressurized. The seal ring 46 is preferably square in cross-section, as shown in FIG. 6 and others, however, it may be rectangular, chamfered at the lower inner corner to avoid air bubbles during casting, or even square with an inverted step 50, as depicted in FIG. 14 and still be within the scope of the invention. Any resilient material may be employed for the ring 46, such as neoprene, polyurethane, silicone, Teflon, Viton BUNA-N, etc., in either a hollow or solid configuration.

An optional O-ring 48 may be disposed within each first channel 34 of the annular ring 32 positioned toward the pipe casing end 24 to ensure a hermetic seal within the inner leakage path when pressure is introduced into the spatial pathway 42 formed by the presence of the annular ring 32. This O-ring 48 is depicted in its preferred location in FIGS. 9 through 12, 15 and 17, and is constructed of a conventional resilient material compatible with the elements involved. This element is described as being round, however, other configurations are acceptable, such as square, irregular, including one commonly known as a quad-ring.

Figure 17:
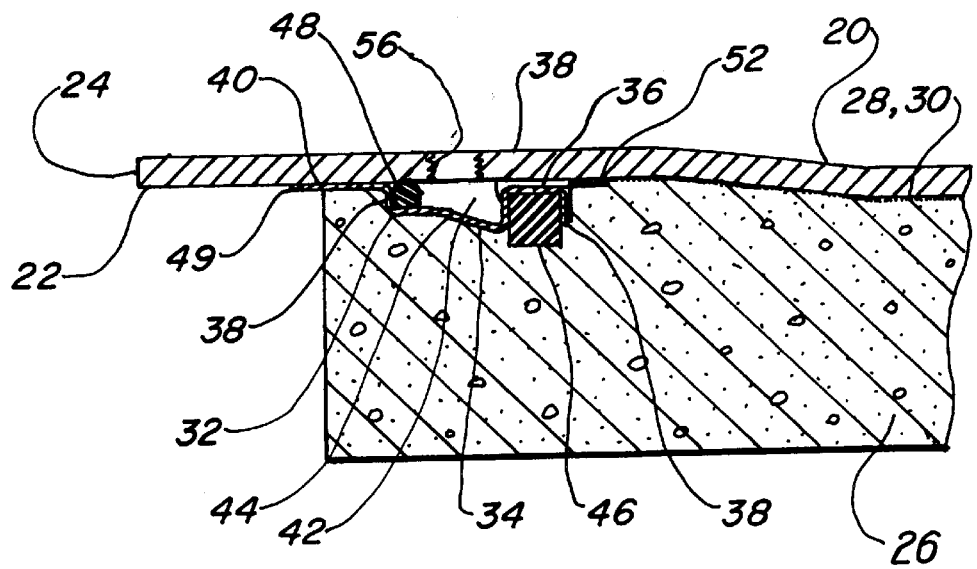
FIG. 17 is a partial end sectional view of the invention with the annular ring having an O-ring, unequal length channel legs, a threaded hole and a swaged pipe casing.

FIG. 17 illustrates yet another embodiment of the annular ring 32 wherein the legs 38 of the first channel 34 are uneven, making the web even easier to bend upwardly.

Joining means hermetically seal the inner leakage path between the annular ring 32 and the pipe casing 20, preferably by welding a circumferential weld bead 49. This weld is simply a coalescence of metal produced by heating to the melting point and as both the casing 20 and annular ring 32 are of the same material, arc welding is the preferred method, as it creates a homogeneous joint, a hermetic seal and also a strong connection. Another alternate embodiment of this joining means is illustrated in FIG. 15 and consists of casting a portion of concrete material in front of the annular ring 32 holding it in place by adherence of the concrete to both the annular ring 32 and the pipe casing 20 at its inner wall 22 as no non-cohesive material 28 is present. With this embodiment it is imperative that the O-ring 48 is used within the first channel 34 of the annular ring 32 to assure a definite hermetic seal when pressure is applied and no non-cohesive material is employed on the inner wall 22 adjacent to the pipe ends.

A temporary seal 52 is disposed between the annular ring 32 and the inner wall 22 of the pipe casing 20. This seal 52 is used to separate the ring from the concrete tube 26 and block the spatial pathway 42 from being filled with concrete when the tube 26 is being poured. The seal 52 is only temporary, as it is ruptured when pressure is applied to the pathway 42, therefore, the preferred material is a waterproof pressure sensitive tape, however, other forms of material may also be used with equal ease.

To pre-stress the concrete pipe, a pressurized solidifying compound 54 is disposed between the inner wall 22 of the pipe casing 20 and the concrete tube 26 within the spatial pathway 42 and the region coated with non-cohesive 30. The solidifying compound 54 is pressurized from 50 to 1,500 pounds per square inch (345 kPa to 10,343 kPa), according to the diameter of the pipe and the desired pre-stress. This pressurization compresses the concrete tube 26 inwardly toward the center of the tube creating a stressed condition or internal distribution of force on the concrete deforming its basic structure producing supplementary tensile strength to the composite pipe. The pressurization may be sufficient to bulge the pipe casing 20 outwardly or force it to grow in diameter, and because of the Poisson's ratio effect, when the casing 20 swells in diameter, it shortens slightly in length, this shrinkage of the casing 20 may cause the annular ring 32 to buckle, therefore, in the alternate embodiment, the upset bend 44 in the first channel 34 permits controlled deformation in an area that does not compromise the integrity of the seal ring 46, as previously discussed. When the solidifying compound 54 hardens, the compression upon the concrete tube 26 is retained and the pressurization source may be detached. It should be noted that the compression of the compound 54 may be by any convenient means, such as a mechanical pump.

Any non-compressible fluid may be used in its liquidous state as the solidifying compound 54, such as a grout of cementitious material, thermoset plastic, hydraulic cements, etc. It has been found, however, that an epoxy substance having a resin and a hardener in two parts is ideal for the application, as it has little shrinkage and substantial compressive strength when it hardens.

Means to introduce the solidifying compound 54 into the annular ring spatial pathway 42 and region coated with non-cohesive material 30 are provided by drilling a series of holes 56 in the casing 20 in linear alignment with the spatial pathway 42 and covering them with hollow threaded bosses 58 in the form a pipe couplings or hex nuts welded in place. When the pipe casing 20 has sufficient thickness, the holes 56 may be tapped in place eliminating the necessity of the addition of the bosses 58. In either event an unrestricted route is provided directly into the appropriate space. These bosses 58 are illustrated in FIGS. 1, 2 and 7 through 15 and the threaded holes 56 in FIGS. 16 and 17. On particularly long runs either element 56 or 58 may be additionally located in the middle of the pipe casing or if the occasion demands, with FIG. 13 illustrating such a position. At least two of these bosses 58 or threaded holes 56 are appositely positioned over each pathway 42 with one used for entry and the other for venting atmospheric pressure when the compound 54 is introduced. A plug or valve may be either removed or opened for venting.

The other two or more bosses 58 opposite the vents are used for introduction of the compound 54 and may incorporate a check valve 60 permitting the requisite pressurizing equipment to be detached for cleaning while the compound 54 is still in the liquid state.

The fabrication technique is basically simple and not difficult for those familiar with the industry methodology. The pipe casing 20 is first cut to length and holes 56 are drilled near each end 24 with the hollow bosses 58 welded over the holes. An annular ring 32 is positioned into the casing 20 at each end and welded in place on the trailing edge of the longitudinal flange 40. The temporary seal 52 in the form of tape is placed on the leg 38 of the second channel 36 of each ring 32 and jointly to the adjacent inner wall 22 of the casing 20 as illustrated in FIGS. 14–17. The resilient seal ring 46 is embedded into each second channel 36 of the ring 32 and a layer of non-cohesive material 28, such as oil, is sprayed upon the inner wall 22 of the casting. The casing 20 is placed over a standard mandrel (not shown) and concrete is poured in the remaining space.

After the concrete has cured and the mandrel is removed, the solidifying compound 54 is injected through the check valves 60 into the pathway under pressure. When this void is filled the vent bosses 58 are plugged and the required pressure is allowed to build up, forcing the compound into both passageways 42 and expanding into the region coated with non-cohesive material 30. The presence of the non-cohesive material 28 permits the compound to penetrate the region 30 entirely with minimal effort. This pressure on the non-compressible compound 54 not only fills the region 30, but expands the casing 20 slightly, and shrinks the concrete tube 26, providing the desired compressive stress on the tube. The presents of pressure on the resilient seal ring 46 assures a proper and continuous seal of the outer leakage path between the concrete tube 26 and the inner surface of the annular ring second channel 36 and also the resilient seal ring 46. The shape of the annular rings permits radial pressure to be applied to each seal ring 46 compressing the seal against the tube 26. The pressurized compound supply may be removed, whereby the check valve 60 retains the internal pressure until the compound 54 solidifies, thereafter continuing the stressing by compression against the solid material.

In the event O-rings 48 are employed, they function as a secondary seal for the inner leakage path between each annular ring 32 and the casing 20 in the event that the circumferential weld beads 49 are not integrally sound having cracks or voids present in the weld, not achieving a flawless seal.

Connection of the pre-stressed concrete pipe, one end to the other is accomplished by conventional joints, such as butt welding with a back-up ring over the weld! lapped one end inside the other and then welded, or a rolled seal groove section welded to the casing 20 with an O-ring gasket completing the seal. Grout with steel reinforcement is normally poured in the gap between the ends of the concrete tube 26 creating a smooth inner surface of material having the same inside diameter as the tube 26.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms, which may come within the language and scope of the appended claims.

What is claimed is:

1. A pre-stressed concrete pipe comprising;
   a hollow tubular outer pipe casing having an inner wall and opposed ends,
   a concrete tube within said pipe casing,
   a film layer of a non-cohesive material positioned between the inner wall of the pipe casing and the concrete tube, forming a superficial fissure region therebetween,
   a metallic double channel annular ring positioned within each end of the outer pipe casing contiguous with both the concrete tube and the casing defining a peripheral spatial pathway,
   joining means hermetically sealing the annular rings to the pipe casing on the casing inner wall adjacent to each end,
   a resilient seal ring held captive by each annular ring and contiguous with the concrete tube forming impervious restricting bands,
   a temporary seal disposed between each annular ring and the inner wall of the pipe casing for transitorily separating the rings from the concrete tube, and
   a pressurized solidifying compound disposed between the pipe casing and the concrete tube within the spatial pathways and the region coated with non-cohesive material such that the concrete of the tube is constantly compressed in an inward direction creating a stressed condition on the concrete producing supplementary tensile strength to the composite pipe.

2. The pre-stressed concrete pipe as recited in claim 1 wherein said hollow tubular outer pipe is metallic and of a thickness permitting controlled expansion when pressurized by said solidifying compound.

3. The pre-stressed concrete pipe as recited in claim 1 wherein said concrete tube is cast over a mandrel.

4. The pre-stressed concrete pipe as recited in claim 1 wherein said non-cohesive material is a petroleum based substance.

5. The pre-stressed concrete pipe as recited in claim 1 wherein said metallic double channel annular rings are of a roll-formed construction, each having a first channel and a second channel opposed to each other with the first channel legs facing the pipe casing inner wall and the second channel legs facing inwardly in an opposite direction.

6. The pre-stressed concrete pipe as recited in claim 5 wherein said annular ring first channel incorporates an upset bend facing the inner wall of the pipe casing such that when pressure is applied to the solidifying compound the annular rings may bow at the bend, due to linear contraction of the pipe casing, without deforming the balance of the annular ring.

7. The pre-stressed concrete pipe as recited in claim 5 wherein said annular ring second channel encloses said resilient seal ring on three sides with a snug fit providing a hermetic seal when pressure is applied to the solidifying compound assuring closure as the concrete tube is pressurized.

8. The pre-stressed concrete pipe as recited in claim 5 further comprising an O-ring disposed within each first channel of the annular ring toward each pipe casing end to insure a hermetic seal when solidifying compound is introduced into the spatial pathway of each annular ring.

9. The pre-stressed concrete pipe as recited in claim 1 wherein said joining means is a coalescence of metal produced by heating to the melting point such as welding.

10. The pre-stressed concrete pipe as recited in claim 1 wherein said joining means are a portion of concrete material cast in front of each annular ring holding them in place by adherence of the concrete to both the annular ring and the pipe casing inner wall.

11. The pre-stressed concrete pipe as recited in claim 1 wherein said temporary seal is waterproof pressure sensitive tape.

12. The pre-stressed concrete pipe as recited in claim 1 wherein said pressurized solidifying compound is an epoxy substance having a resin and a hardener in two parts in its liquidous state.

13. The pre-stressed concrete pipe as recited in claim 1 wherein said solidifying compound is pressurized at a pressure of from 50 pounds per square inch (345 kPa) to 1,500 pounds per square inch (10,343 kPa).

14. The pre-stressed concrete pipe as recited in claim 1 further comprising means to introduce said solidifying compound into said annular ring spatial pathway and the region coated with non-cohesive material.

15. The pre-stressed concrete pipe as recited in claim 14 wherein said means to introduce said solidifying compound into said annular ring spatial pathway and the region coated with non-cohesive material further comprising, said pipe casing having a plurality of threaded apertures within the casing in linear alignment with each annular ring spatial pathway such that an unrestricted route is provided directly into appropriate spaces.

16. The pre-stressed concrete pipe as recited in claim 15 wherein at least two threaded apertures are appositely positioned over each spatial pathway for venting atmosphere therefrom when the solidifying compound is introduced.

17. The pre-stressed concrete pipe as recited in claim 15 wherein at least two threaded apertures temporarily contain a check valve for maintaining pressure on the solidifying compound after introduction permitting detachment of pressurizing equipment for cleaning following use.

18. A method of making a pre-stressed concrete pipe comprising the steps of, provided a hollow tubular outer pipe casing having an inner wall and opposed ends, attaching a metallic double channel annular ring within each end of the outer pipe casing with hermetically sealed joining means leaving a peripheral spatial pathway between each ring and the pipe casing, positioning a resilient seal ring within each double channel annular ring forming restricting bands, installing a temporary seal between each annular ring and the inner wall of the pipe casing creating a transitorily securement therebetween, applying a film layer of non-cohesive material upon the inner wall of the pipe casing, casting a concrete tube within said pipe casing over a mandrel leaving a superficial fissure region between the casing and the concrete as permitted by the presence of the film layer of non-cohesive material, and, after the concrete tube has cured, injecting under pressure, a solidifying compound jointly into the ring spatial pathways and into the region coated with the non-cohesive material, between the pipe casing and the concrete tube by rupturing the temporary seal, such that when the solidifying compound has hardened the concrete is constantly compressed in an inward direction creating a stressed condition on the concrete producing supplementary tensile strength to the composite pipe.

19. A pre-stressed concrete pipe comprising, a hollow outer pipe casing covering a concrete tube, a pair of metallic annular rings joined one within each end of the pipe casing, each having a peripheral spatial pathway and said rings contiguous with the concrete tube, a pair of resilient seal rings held captive by each annular ring forming impervious restricting bands, and a pressurized solidifying compound disposed within the spatial pathways and between the outer pipe casing and the concrete tube such that the concrete of the tube is constantly compressed in an inward direction creating a stressed condition on the concrete producing supplementary tensile strength to the composite pipe.

* * * * *